(12) United States Patent
Temkin et al.

(10) Patent No.: US 7,098,888 B2
(45) Date of Patent: Aug. 29, 2006

(54) DEVELOPMENT OF STEREOSCOPIC-HAPTIC VIRTUAL ENVIRONMENTS

(75) Inventors: Bharti Temkin, Ransom Canyon, TX (US); Kirk Watson, Round Rock, TX (US); Eric Acosta, Lubbock, TX (US)

(73) Assignee: Texas Tech University System, Lubbock, TX (US)

( * ) Notice: Subject to any disclaimer, the term of this patent is extended or adjusted under 35 U.S.C. 154(b) by 141 days.

(21) Appl. No.: 09/844,881

(22) Filed: Apr. 28, 2001
(Under 37 CFR 1.47)

(65) Prior Publication Data

US 2002/0084996 A1  Jul. 4, 2002

Related U.S. Application Data

(60) Provisional application No. 60/200,472, filed on Apr. 28, 2000.

(51) Int. Cl.
*G09G 5/00* (2006.01)

(52) U.S. Cl. .......................................... 345/156; 345/7

(58) Field of Classification Search .............. 345/6–9, 345/204, 156; 318/568.11, 561; 463/45, 463/262; 348/51, 45, 56, 77; 600/407, 130, 600/417, 429
See application file for complete search history.

(56) References Cited

U.S. PATENT DOCUMENTS

| | | | | |
|---|---|---|---|---|
| 5,526,812 | A * | 6/1996 | Dumoulin et al. | 600/407 |
| 5,694,013 | A * | 12/1997 | Stewart et al. | 318/561 |
| 5,709,219 | A | 1/1998 | Chen et al. | 128/782 |
| 5,724,264 | A | 3/1998 | Rosenberg et al. | 364/559 |
| 5,737,505 | A | 4/1998 | Shaw et al. | 395/119 |
| 5,749,362 | A * | 5/1998 | Funda et al. | 600/407 |
| 5,786,848 | A * | 7/1998 | Isobe et al. | 348/51 |
| 5,802,353 | A | 9/1998 | Avila et al. | 395/500 |
| 5,808,588 | A * | 9/1998 | Lin | 345/6 |
| 5,831,408 | A | 11/1998 | Jacobus et al. | 318/568 |
| 5,833,633 | A | 11/1998 | Sarvazyan | 600/587 |
| 5,844,392 | A | 12/1998 | Peurach et al. | 318/568 |
| 6,057,828 | A | 5/2000 | Rosenberg et al. | 345/156 |
| 6,088,020 | A * | 7/2000 | Mor | 345/156 |
| 6,131,097 | A * | 10/2000 | Peurach et al. | 707/102 |
| 6,281,651 | B1 * | 8/2001 | Haanpaa et al. | 318/568.11 |
| 6,801,187 | B1 * | 10/2004 | Stewart et al. | 345/156 |

OTHER PUBLICATIONS

U.S. Appl. No. 09/844,635 Temkin et al., filed Apr. 28, 2001.

(Continued)

*Primary Examiner*—Richard Hjerpe
*Assistant Examiner*—Kevin M. Nguyen
(74) *Attorney, Agent, or Firm*—Burns & Levinson LLP; Jacob N. Erlich

(57) ABSTRACT

The present invention provides a virtual-haptic environment that can be used to advantage to simulate and teach surgical procedures. Computer haptics simulates human sense of touch is provides with visual stereoscopy that simulates our natural depth perception and feeling of touch. Integration of these two senses enhances sense of realism. Thus by coupling force-feedback (or haptic) devices with a stereoscopic display, results in the illusion of being "inside" a virtual world, by being able to "see" and "touch and feel" 3D virtual environment. The computer based (on a PC using NT operating system) present invention provides an inexpensive, easy-to-use technique for generating a stereoscopic-haptic environment that provides a realistic virtual touch and see environment and dynamically adding haptic characteristics.

4 Claims, 4 Drawing Sheets

OTHER PUBLICATIONS

U.S. Appl. No. 09/677,073, Temkin et al., filed Sep. 29, 2000.

U.S. Appl. No. 60/200,472, Temkin et al., filed Apr. 28, 2000.

Acosta, E. et al., "Development of a Haptic Virtual Environment," Proc. 12$^{th}$ Symp. IEEE/Computer-Based Medical Systems CBMS-1999, Jun. 19-20, 1999.

Acosta, E. et al., "G2H—Graphics-to-Haptic Virtual Environment Development Tool for PC's," Medicine Meets Virtual Reality, Envisioning Healing, J. D. Westwood et al. (Eds), MMVR2000, Jan. 27-30, 2000.

Watson, K. et al., "Development of Haptic Stereoscopic Virtual Environments," Proc. 12$^{th}$ Symp. IEEE/Computer-Based Medical Systems CBMS, Jun. 19-20, 1999.

Stephens, B. et al., "Virtual Body Structures: A 3D Structure Development Tool from Visible Human Data", Medicine Meets Virtual Reality, Envisioning Healing, J. D. Westwood et al. (Eds), MMVR2000, Jan. 27-30, 2000.

Burgin, J. et al., "Haptic Rendering of Volumetric Soft-Bodies Objects," The third PHANToM User Workshop (PUG 98), Oct. 3-6, 1998 MIT Endicott House, Dedham, MA.

Acosta, E. et al., "Haptic Texture Generation A Heuristic Method for Virtual Body Structures," 14th IEEE Symposium on Computer-based Medical Systems 2001, Jul. 26-27, 2001.

Temkin, B. et al., "Virtual Body Structures," 3rd Conference, Visible Human Project, Washington, D.C., Oct. 2000.

Marcy, G. et al., "Tactile Max: A Haptic Interface for 3D Studio Max," The third PHANToM User Workshop (PUG 98), Oct. 3-6, 1998 MIT Endicott House, Dedham, MA.

Vahora, F. et al., "Virtual reality and women's health: A breast biopsy system," The Conference of Physical & Informational Technologies: Options for a New Era in Healthcare, Jan. 20-23, 1999.

Vahora, F. et al., "Development of Real-Time Virtual Reality Haptic Application: Real-Time Issues," Proc. 12$^{th}$ Symp. IEEE/Computer-Based Medical Systems CBMS-1999, Jun. 19-20, 1999.

Poceciun, V.V. et al., "Computerized Collection and Analysis of HVI Data," Beltwide Cotton Conference, Jan. 3-7, 1999.

Poceciun, V.V. et al., "Integration of Advanced Technology Into a Cotton Analysis and Decision Support System," Beltwide Cotton Conference, Jan. 3-7, 1999.

* cited by examiner

DEVELOPMENT OF STEREOSCOPIC-HAPTIC VIRTUAL ENVIRONMENTS

CROSS REFERENCES TO RELATED APPLICATIONS

This application claims priority of co-pending U.S. Provisional Application Ser. No. 60/200,472 filed Apr. 28, 2000, entitled "DEVELOPMENT OF STEREOSCOPIC-HAPTIC VIRTUAL ENVIRONMENTS", which is also incorporated in this application by reference.

FIELD AND BACKGROUND OF THE INVENTION

The present invention relates to apparatus and software cooperatively integrating haptic or touching and stereoscopic or three dimensional visual computer interfaces, and is more particularly associated with such apparatuses and software as applied to surgical simulations. The integration in computer generated virtual environments of interfacing of physically felt force-feedback devices (haptic interface devices) that provide the touch or feel sensation and stereoscopic visual interfaces that provide visual three dimensional (3D) objects have not been extensively developed. Those that exist use expensive complex and often ad hoc hardware and software that are difficult to implement and more difficult to service and/or modify. High end, expensive graphic workstations, e.g. Sun Microsystems with specialized hardware and/or software have been so used, but are not amendable to routine use due to the complexity and the expense.

Before proceeding some definitions will be helpful in understanding the invention.

Haptics: Haptics refers to touch. Human sense of touch, human haptics, differs fundamentally from other human sensory modalities in that it is bilateral in nature: to touch an object, the object must "push" back. In computer generated haptics, a computer interface device is used that provides a physical touch to the human that corresponds to the real three-dimensional sense of touch that allows one to feel textures and shapes of objects, modulate objects and even deform objects.

Two major components of computer haptics are collision detection of virtual objects with the haptic interface device, and the determination and application of a force feedback to the user via the haptic interface device. Prior art data structures and algorithms applied to haptic rendering have been adopted from non-pliable surface-based (two dimensional) graphic systems. These prior art techniques and systems are inappropriate and limited due to the different characteristics required for haptic rendering of three dimensional or volumetric soft bodies.

Stereoscopic Display: Stereoscopic herein refers to true 3D viewing of objects. In many prior art systems 3D images are rendered for viewing in a 2D format (e.g., on a flat monitor). True 3D viewing provides the user with the appearance of true depth.

When viewing an object in 3D, both eyes see the object from a slightly different perspective. Each eye perceives a slightly different image, with the brain naturally fusing these two images into one by matching up the similarities and adding in the small difference. The result is the illusion of depth. This process of stereopsis can be simulated by 1) generating the two dimensional image for each eye, and 2) presenting the left eye image only to the left eye and the right eye image only to the right eye. This brief review suffices since stereoscopy is well understood in the art.

Such prior art devices are even more limited if applied to teaching the complex skills associated with medical surgery. Surgery skills are taught on live patients or animals. A computer system that provides true touch and corresponding 3D vision for volumetric soft bodies is needed in the art.

It is an object of the present invention to generate a stereoscopic-haptic computer interface suitable for providing virtual environment.

It is another object of the present invention to result in the illusion of being able to "see" and "touch and feel" 3D virtual environment, for example, a surgeon operating on a virtual patient, but with true-to-life touching and seeing.

It is yet another object of the present invention to produce cost-effective, real-time, interactive, stereoscopic haptic virtual environment with minimal hardware.

It is yet another object of the present invention to transform the virtual environment from a flat, formless 2D experience to a more realistic and solid 3D experience.

It is still another object of the present invention to provide 3D organ models for study by and training of students.

SUMMARY OF THE INVENTION

The objects set forth above as well as further and other objects and advantages of the present invention are achieved by the embodiments of the invention described herein below.

The present invention includes generating a stereoscopic-haptic interface to simulate human sense of touch and depth perception with display 3D information in a flat 2D environment. The haptic interface and stereoscopic technologies include: 1) generating stereoscopic images using, active stereoscopic displays where shutter glasses shutter on and off in synchrony, interlaced video displays and a stencil buffer to draw images on different scan lines; and 2) making a stereoscopic-haptic system using a point-based haptic device, all with supporting software. The haptic environments are created independently of their graphical representations allowing for independent development and troubleshooting, but where the haptic and visual presentations are coordinated. The visual 3D is accomplished with a single camera that is moved to simulate the position of the left eye and then the right eye. The image in each position is stored in a stencil buffer that records the left eye image on even scan lines and the right eye image on the odd scan lines of an interlaced video system. The presentation of the two images via the shuttered glasses to the corresponding eye in a coordinated fashion and the coordinated haptic device allows for 3D visualization and corresponding touching to be experienced by the user in the virtual environment.

An advantage of the present invention is the operation without costly extra hardware and software as described above. The present invention uses the vertical synchronization signals directly from the video signal to switch the shutters on the glasses and the multiplexing of the left and right images by using interlaced scan lines minimizes complex and costly hardware and synchronizing software. The result is that the haptic and the 3D visual are combined with a minimum of extra hardware and software to provide a cost effective virtual environment suitable for teaching and practicing complex, difficult techniques that depend on sight and touch.

For a better understanding of the present invention, together with other and further objects thereof, reference is made to the accompanying drawings and detailed description.

DETAILED DESCRIPTION OF PREFERRED EMBODIMENTS

Figure 1:
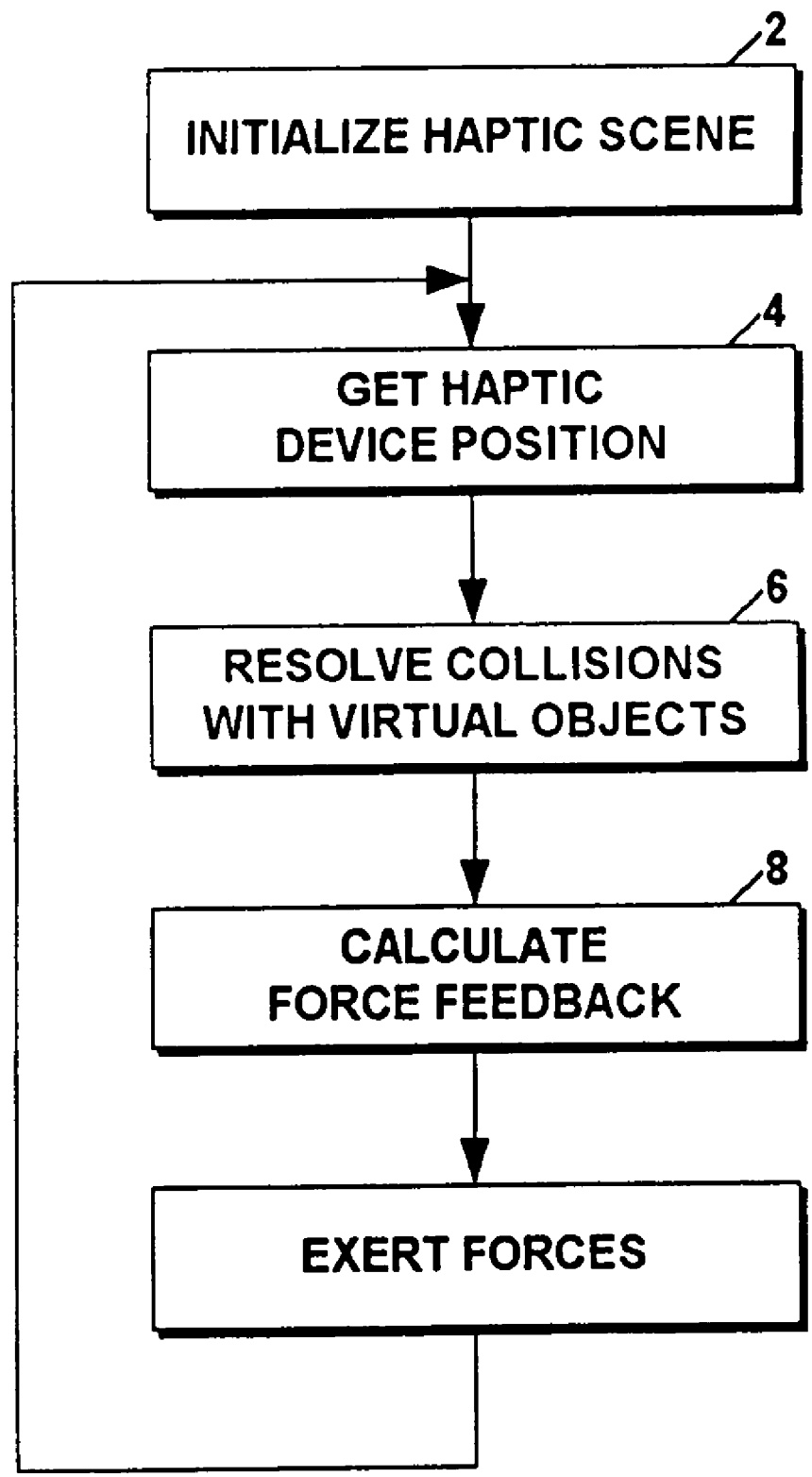
FIG. 1 is a flow diagram implementing a haptic application and interface device.

FIG. 1 is a flow diagram of implementing a programmable haptic pointing device in an environment that simulates human touch. The location, 3D shape, and feel of the object are programmed so that, when the user moves the interface device, the positional information in virtual space is retained, and based on what the object being touched (as programmed) the device provides a force feedback to the hand of the user.

Referring to FIG. 1, the scene is initialized 2 as to the touch and shape of the objects in the scene and their virtual positions. The relative virtual position 4 of the haptic interface is determined. As the interface device is moved, the touching of the objects in the scene is determined by resolving collisions 6 with the virtual objects. Depending on the type of object encountered the interface device presents back 10 to the user a force calculated 8 to duplicate the force that an actual object would provide.

The force interaction of FIG. 1 provides means for training of cognitive skills to users, but can also allow evaluations of sensory-motor skills; for example, an advanced haptic surgical simulation not only is capable of teaching the complex physical interaction skills, but, as mentioned above, also can record and play back the mechanical signals. This later feature can be used to monitor trainee's skill acquisition, customize the training program, or even let a trainee practice on prerecorded actions of an expert.

Figure 2:
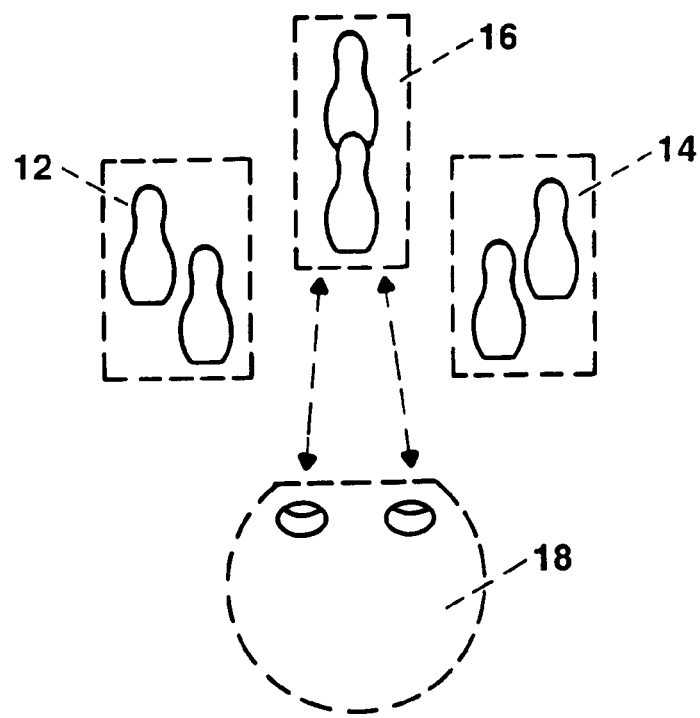
FIG. 2 is a representation of left and right eye images combined to form 3D stereoscopic image.

FIG. 2 is a diagram showing the perspective binocular disparity between the left eye 12 and the right eye 14 when viewing a scene and the scene frontally shown. 16. This disparity provides the human brain 18 with information that is the stereoscopic 3 D effect.

Figure 3:
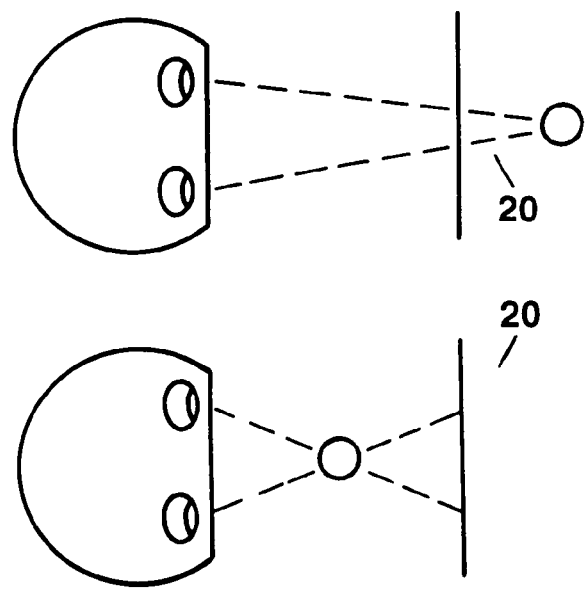
FIG. 3 represents parallax issues in 3D presentations.

FIG. 3 shows the generating of left/right eye images. The depth cue that produces the stereoscopic effect is binocular disparity discussed above. However, it is possible for several depth cues to either reinforce 20 or conflict 22 with each other. The latter should be avoided when stereoscopic 3D virtual images are generated.

Figure 4:
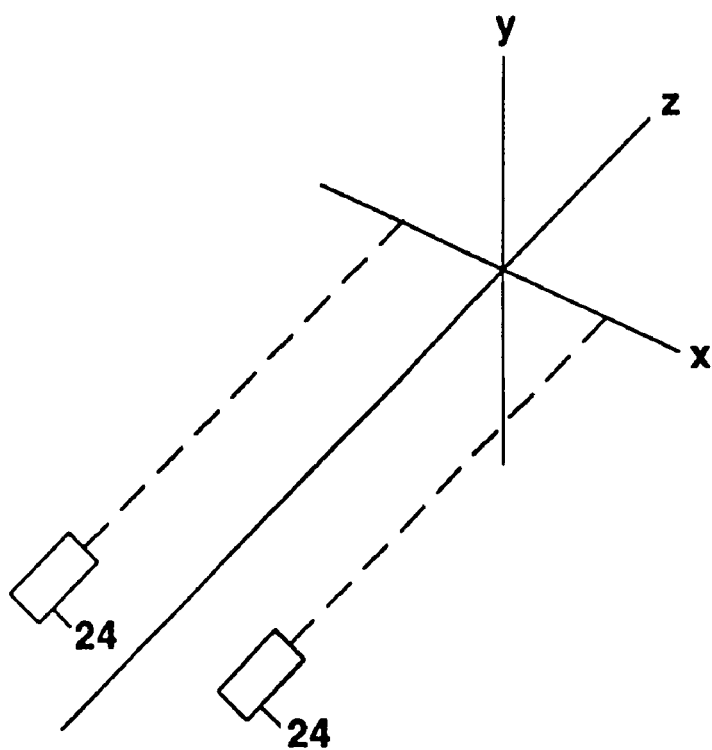
FIG. 4 is a parallel camera model.

FIG. 4 shows a parallel camera model 24 that is used in a preferred embodiment of the present invention. Nearly all computer displays are flat. Thus, the images projected on these displays are also flat. However, distortion can occur as we attempt to simulate the human eye, since the eye has a curved surface. The simple parallel camera model substantially removes distortion in projection, but there are 1) overlapping of the viewing spaces of the cameras is not always complete, which can cause a fraction of the image to be not stereoscopic, and 2) viewer is forced to converge his own eyes, since the cameras do not converge. The viewer having to keep focus on the monitor can cause a disparity between the depth cues of convergence and accommodation (changing of the focal lens of eyes to focus on an object). With practice, however, this disparity is not a problem.

In a preferred embodiment an active stereoscopic display is used for image presentation, where shutter glasses shutter on and off in synchrony, presenting one image at a time to each eye in quick succession while the other eye is covered. The switching presentation is performed at 60 Hz so that the user "sees" only one stereoscopic image. When rendering a complex, dynamic, real time scene the images must be switched quickly enough or the stereoscopic effect would be lost. This problem is solved in a preferred embodiment by using the interlaced mode available on many video cards and a stencil buffer. Interlaced video displays only the even set of horizontal scan lines on a vertical scan followed by the odd set of scan lines on the next pass. This allows for smoother animation with a relatively low refresh rate as both the left and right eye images are displayed simultaneously on sequential vertical scans seen as one image, and the stereoscopic effect does not suffer. There is a concurrent loss of resolution that is not a problem since the brain merges the images and the resulting resolution is still acceptable. The stencil buffer is used to render the left eye images only on the even scan lines (on stencil), and the right eye image only on the odd scan lines (off stencil). This preferred embodiment minimizes the timing of switching the shutters on each vertical synch pulse from the display. The left eye image is on the screen during one entire vertical scan of even lines and the right eye is on the screen on the next vertical scan of odd lines.

Figure 5:
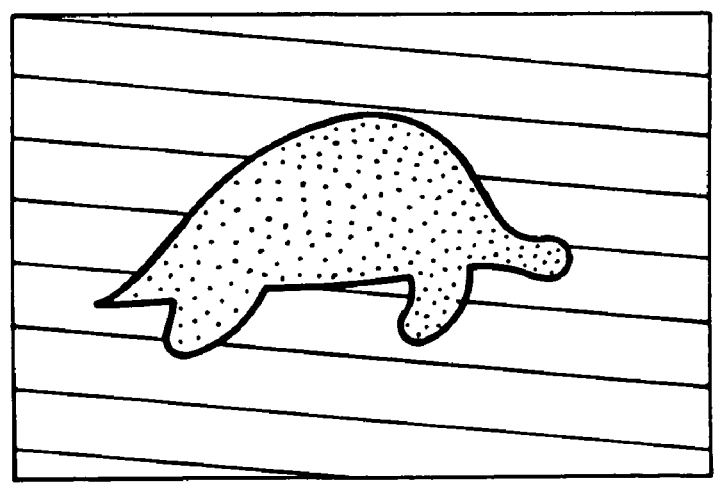
FIG. 5 is a flowchart of a preferred embodiment process architecture.

The basic idea is to move the camera to the left and render the scene on stencil and then move the camera to the right and render off stencil. Then the right and the left eye images are interlaced together. When the video is placed in an interlaced mode, the result will be that the left eye image is displayed separately from the right eye image. The shutter glasses are automatically synchronized (as known in the art via a transmitter plugged into the output of the video card) to the vertical sync signals of the video card when in interlaced mode, the left eye will only see the left eye image and the right eye will only see the right eye image. FIG. 5 shows a depiction of the scene of a turtle with the stencil on. Here, for example, only the even horizontal scan line of the interlaced video are present that are to be presented to the left eye in the example described herein. The right eye will be presented with the odd horizontal scan lines coordinated by the video vertical retrace, synchronization or vertical blank signal associated.

Figure 6:
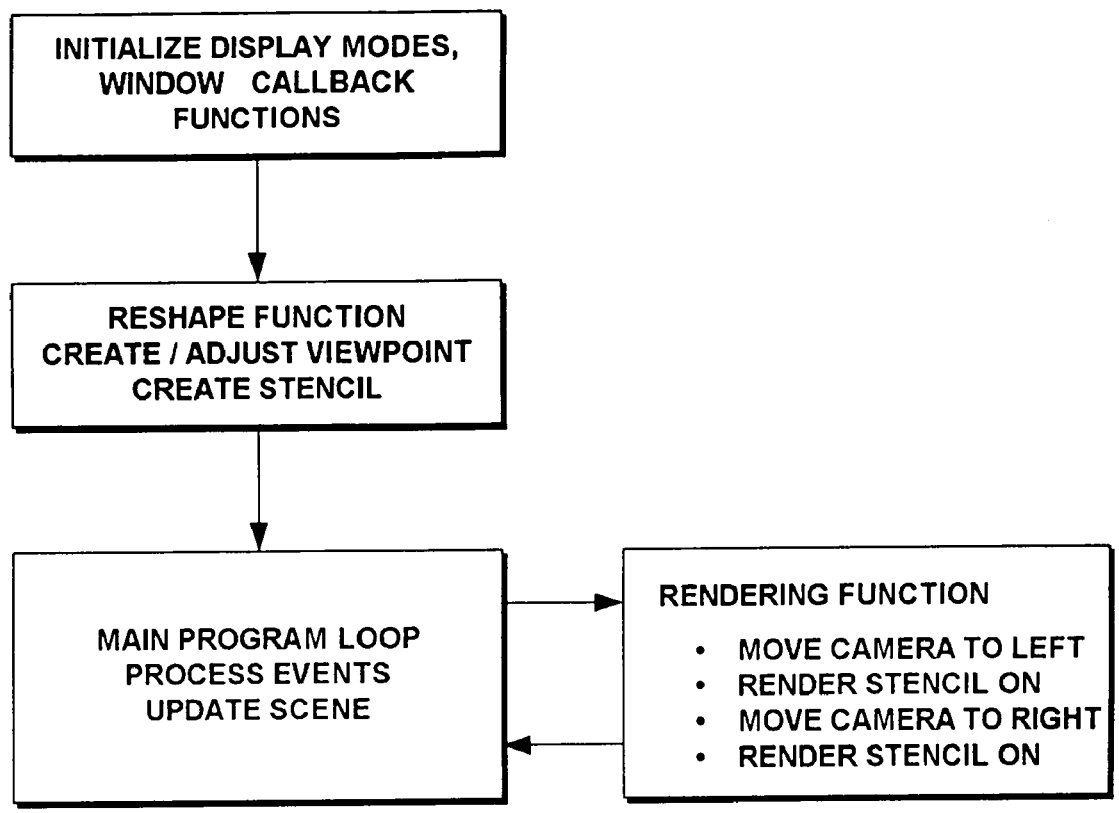
FIG. 6 shows a scene with the stencil rendered.
Figure 7:
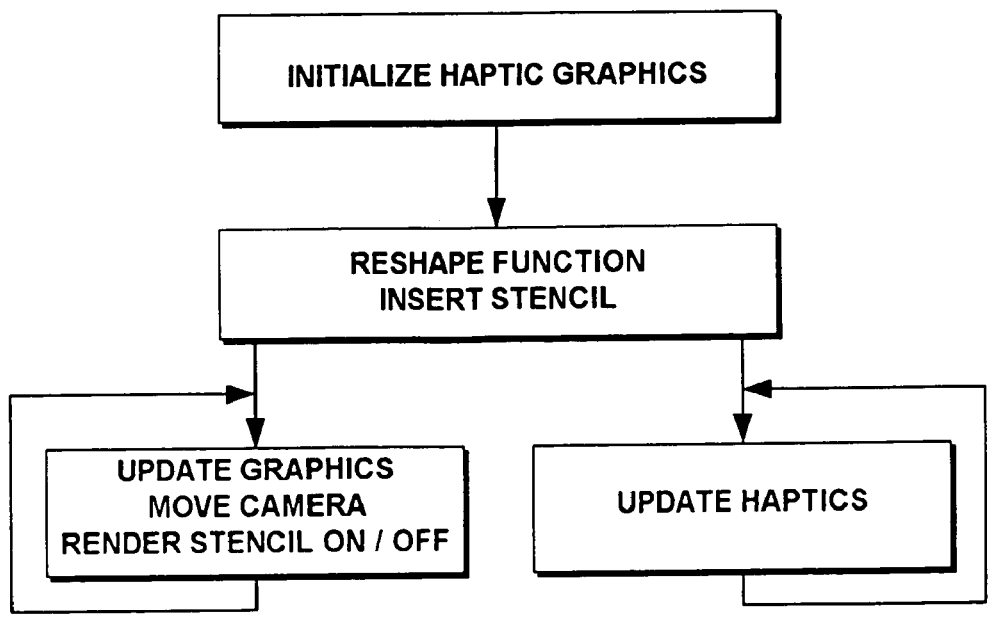
FIG. 7 is a diagram of showing the independence of the haptic and visual representation.

Referring to FIG. 6, the system is initialized 26 including a "callback" function that is used by the programmer to graphically render the haptic scene and ensure that the optical and haptic presentations and operations are coordinated, consistent and synchronized to each other. This task is well within the capabilities of those skilled in the art. The stencil and shape information is installed to accommodate the haptic and the two camera visual environment. The scene is 3D visually processed by moving the camera and turning the stencil on and off to create the visual 3D effect. The visual is then incorporated with the haptic in the main loop 26. FIG. 7 indicates the independence of the 3D visual and the haptic interfaces. However, the combination is coordinated as described herein to present a realistic virtual scene with touch and sight. Although not discussed adding coordinated audio would enhance the present invention in particular applications. Such an addition and coordination are within the skill of the art when the present haptic/visual invention is disclosed.

The above techniques were applied in a preferred embodiment to an existing non-stereoscopic haptic scene. This haptic scene consists of several simple shapes that can be moved, rotated, translated and scaled. By applying the technique to the rendering function, it is possible for the user to view the scene stereoscopically using shutter glasses. The user also has the ability to dynamically adjust the perceived depth of the scene, and to control whether the objects appear to recess into the monitor or pop out of it. The user can view and feel the objects in three dimensions in real time. A simple stereoscopic haptic environment is finally created.

A preferred embodiment of the present invention included a 300 MHz personal computer running the NT operating system. The video was run at 43 Hz interlaced with shutter glasses. Virtually any computing system, operating system and shutter glasses, known in the art, can be used in preferred embodiments of the present invention.

Although the invention has been described with respect to various embodiments, it should be realized this invention is also capable of a wide variety of further and other embodiments within the spirit and scope of the invention.

The invention claimed is:

1. Method of creating a stereoscopic haptic virtual environment, comprising the steps of:
   providing a computer controlling a display device and operatively coupled to a haptic device;
   generating via programming executing on the computer a stereoscopic graphics for display on the display device by repeatedly performing the steps of:
      rendering a first video image of a scene on stencil at a first position simulating the position of a left eye of a user;
      rendering a second video image of the scene off stencil at a second position simulating the position of a right eye of the user;
      interlacing the first video image and the second video image;
      shuttering views of the display device while displaying the interlaced first and second video images in order to present in quick succession the first image to the left eye of the user and the second video image to the right eye of the user, each of said video images presented to the associated eye while the view of the other eye is shuttered;
   generating haptic scene components including a component representing the haptic device;
   time-synchronizing the stereoscopic graphics and haptic scene components;
   presenting the synchronized stereoscopic graphics and haptic scene components to a user on the display device; and
   providing a force response to the user when collisions among the stereoscopic graphics and the haptic device scene component are resolved.

2. The method of claim 1, wherein the generating step further comprises the steps of:
   providing a visual cue via the display that a collision has been resolve between the haptic device and a virtual object.

3. The method of claim 2, wherein:
   the visual cue is a displayed object model; and
   the force provided is calculated to duplicate the force that an actual object modeled in virtual space would provide when touched with the haptic device.

4. The method of claim 1, wherein:
   the presented synchronized stereoscopic graphics and haptic scene components are coordinated and consistent with each other; and
   the synchronization step allows independent user customization of stereoscopic graphics and haptic scene components parameters.

* * * * *